United States Patent
Aubry

(10) Patent No.: US 10,664,089 B2
(45) Date of Patent: May 26, 2020

(54) CONTROL DEVICE FOR CONTROLLING AT LEAST TWO FUNCTIONS OF A MOTOR VEHICLE

(71) Applicant: DAV, Créteil (FR)

(72) Inventor: Anthony Aubry, Creteil (FR)

( * ) Notice: Subject to any disclaimer, the term of this patent is extended or adjusted under 35 U.S.C. 154(b) by 47 days.

(21) Appl. No.: 15/104,765

(22) PCT Filed: Dec. 18, 2014

(86) PCT No.: PCT/FR2014/000293
§ 371 (c)(1),
(2) Date: Jun. 15, 2016

(87) PCT Pub. No.: WO2015/092169
PCT Pub. Date: Jun. 25, 2015

(65) Prior Publication Data
US 2017/0024058 A1 Jan. 26, 2017

(30) Foreign Application Priority Data
Dec. 19, 2013 (FR) ...................................... 13 03005

(51) Int. Cl.
*G06F 3/041* (2006.01)
*G06F 3/01* (2006.01)
*G06F 3/0488* (2013.01)
*B60K 35/00* (2006.01)
(Continued)

(52) U.S. Cl.
CPC ............ *G06F 3/0416* (2013.01); *B60K 35/00* (2013.01); *B60Q 9/00* (2013.01); *G06F 3/016* (2013.01);
(Continued)

(58) Field of Classification Search
CPC .... G06F 3/0416; G06F 3/016; G06F 3/03547; G06F 3/044; G06F 3/0488; G06F 2203/014; B60K 35/00; B60K 2350/1028
(Continued)

(56) References Cited

U.S. PATENT DOCUMENTS

| 7,808,488 B2 | 10/2010 | Martin et al. |
| 2004/0204129 A1 | 10/2004 | Payne et al. |

(Continued)

FOREIGN PATENT DOCUMENTS

| EP | 2 028 583 A2 | 2/2009 |
| EP | 2 230 582 A2 | 9/2010 |

(Continued)

OTHER PUBLICATIONS

International Search Report issued in PCT/FR2014/000293 dated Mar. 6, 2015 (3 pages).
(Continued)

*Primary Examiner* — Mark W Regn
(74) *Attorney, Agent, or Firm* — Osha Liang LLP

(57) ABSTRACT

The invention relates to a man/machine interface (10) that can be used to control at least two functions of a motor vehicle, said man/machine interface comprising: a capacitive touch pad (20) including at least two control areas (21, 22, 23), each control area being configured to receive a command for at least one function; a haptic feedback device (40) configured to supply feedback to the user of the man/machine interface as acknowledgement of the command; and a control device (30) configured to receive a signal from the touch pad that is representative of a command from the user on the touch pad and to accept the command when the level of the signal received is greater than or equal to a threshold value. The invention is characterised in that the control device is configured to include different threshold values for at least two control areas of the touch pad.

6 Claims, 1 Drawing Sheet

(51) Int. Cl.
*B60Q 9/00* (2006.01)
*G06F 3/0354* (2013.01)
*G06F 3/044* (2006.01)

(52) U.S. Cl.
CPC .......... *G06F 3/03547* (2013.01); *G06F 3/044* (2013.01); *G06F 3/0488* (2013.01); *B60K 2370/1438* (2019.05); *G06F 2203/014* (2013.01)

(58) Field of Classification Search
USPC .......................................................... 345/174
See application file for complete search history.

(56) References Cited

U.S. PATENT DOCUMENTS

| | | | | |
|---|---|---|---|---|
| 2005/0024341 A1* | 2/2005 | Gillespie | ............... | G06F 1/1616 345/173 |
| 2011/0279408 A1* | 11/2011 | Urano | .................... | G06F 3/044 345/174 |
| 2013/0063364 A1 | 3/2013 | Moore | | |

FOREIGN PATENT DOCUMENTS

| | | | | |
|---|---|---|---|---|
| EP | 2230582 A2 * | 9/2010 | ............. | G06F 3/016 |
| EP | 2 375 307 A1 | 10/2011 | | |

OTHER PUBLICATIONS

Written Opinion of the International Searching Authority issued in PCT/FR2014/000293 dated Mar. 6, 2015 (6 pages).

* cited by examiner

CONTROL DEVICE FOR CONTROLLING AT LEAST TWO FUNCTIONS OF A MOTOR VEHICLE

The invention relates to a human/machine interface making it possible to control at least two functions of a motor vehicle and to a dashboard of a motor vehicle comprising a human/machine interface according to the invention.

Motor vehicles are increasingly being equipped with human/machine interfaces comprising a touch pad and making it possible to control functions in the motor vehicle.

This type of human/machine interface can easily be incorporated in a display device, which then becomes a touch screen. The capacitive touch pads have been particularly well received for their great responsiveness and the ease of use for the user.

Also, the human/machine interfaces comprising a capacitive touch pad make it possible to take account of a wide variety of command types; for example commands of "push" type or commands of "slide" or "pinch" type.

The "push" command type corresponds to the pressing by a control means of at least a part of the control zone of a touch pad.

The "slide" or "pinch" command type corresponds to the brushing of at least a part of the control zone of a touch pad by a control means.

One of the issues encountered in the use of this type of human/machine interface is to provide feedback to the user on the recognition of his or her command. In effect, a certain number of commands may not have an immediate effect, for example the setting of the temperature of the vehicle interior. It is however preferable to provide the user with feedback concerning the correct recognition of his or her command. This feedback to the user on the recognition of his or her command is generally executed by means of a haptic effect, for example a vibration.

The level of sensitivity of this type of human/machine interface often requires a fairly fine setting. In practice, it involves finding a compromise that makes it possible to recognize the commands from the different users, and to do so regardless of the characteristics of the control means used, while limiting the sensitivity of the touch pad in order to avoid triggering unwanted commands.

One of the main problems with this type of human/machine interface lies in the sensitivity of the detection of a command from the user and in the haptic effect generated upon the recognition of the command.

Thus, there is a need to provide a human/machine interface which is suited to the different commands from the user.

To this end, the invention relates to a human/machine interface making it possible to control at least two functions of a motor vehicle, the human/machine interface comprising:
- a capacitive touch pad comprising at least two control zones, each control zone being configured to receive a command for at least one function,
- a haptic feedback device configured to provide feedback to the user of the human/machine interface on recognition of the command,
- a control device configured to receive from the touch pad a signal representative of a command from the user on said touch pad and to recognize said command when the level of the signal received is greater than or equal to a threshold value.

The control device is configured to comprise different threshold values for at least two of the control zones of the touch pad.

Advantageously, the recognition of different threshold values as a function of the control zones of the touch pad makes it possible to offer different levels of sensitivity as a function of the zones of the touch pad. Each zone of the touch pad can be dedicated to a type of function or to a type of command. The human/machine interface according to the invention therefore makes it possible to optimize the sensitivities of the different zones of the touch pad.

The human/machine interface according to the invention can also comprise one or more of the features below, considered individually or in all technically possible combinations:
- the haptic feedback device is configured to provide a different haptic effect as a function of the control zone of the touch pad used by the user; and/or
- at least one of the two control zones of the touch pad is a control zone of "push" type configured to receive a "push" type command; and/or
- at least one of the two control zones of the touch pad is a control zone of "slide" or "pinch" type configured to receive a "slide" or "pinch" type command; and/or
- the control device is configured to have a threshold value for the control zone of "slide" or "pinch" type greater than the threshold value for the control zone of "push" type; and/or
- the capacitive touch pad comprises an array of electrically charged electrodes and the signal representative of a command from the user on said touch pad is linked to the disturbance of the electrostatic field generated by the array of electrodes upon a command from the user on the touch pad; and/or
- the amplitude of the signal representative of a command from the user on said touch pad is proportional to the capacitance measured between each electrode of the array of electrodes and the control means of the user upon a command from the user on the touch pad; and/or
- the control device is configured to determine, for at least one of the control zones of the touch pad, the function to be activated when the level of the signal received is greater than or equal to the threshold value corresponding to said zone as a function of the number of electrodes of the array of electrodes of the capacitive touch pad for which the level of the signal is greater than or equal to said threshold value; and/or
- the haptic feedback device is configured to provide a different haptic feedback as a function of the number of electrodes of the array of electrodes of the capacitive touch pad for which the level of the signal is greater than or equal to said threshold value.

The invention relates also to a dashboard of a motor vehicle comprising a human/machine interface according to the invention.

The invention will be better understood on reading the following description given as a non-limiting example of implementation thereof, and on studying the attached drawings in which.

The invention relates to a human/machine interface making it possible to control at least two different functions of a motor vehicle.

Figure 1:
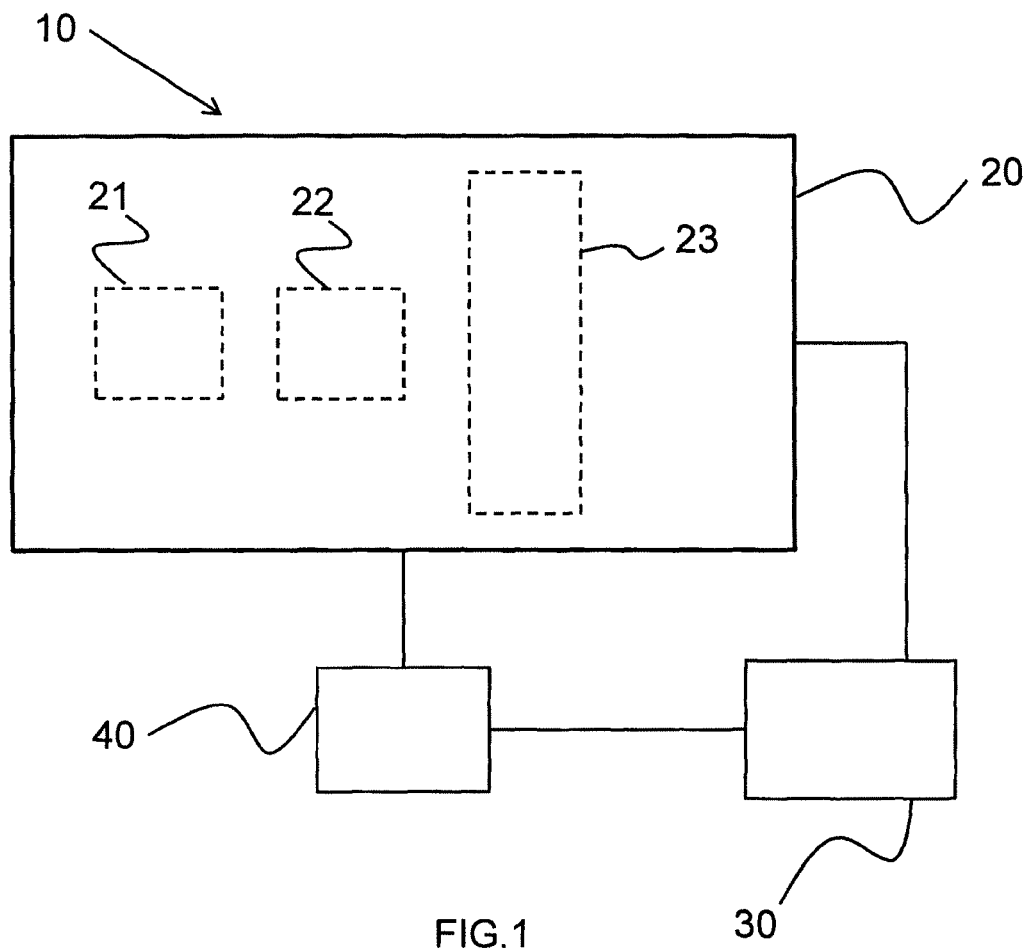
FIG. 1 illustrates a human/machine interface according to an embodiment of the invention.

As represented in FIG. 1, the human/machine interface 10 according to the invention comprises at least:
a touch pad 20,
a haptic feedback device 40, and
a control device 30.

The touch pad 20 is preferably of capacitive type. As represented in FIG. 1, the touch pad 20 comprises a plurality of control zones, for example three control zones 21, 22 and 23. Each of the control zones 21, 22, is configured to receive at least one command corresponding to at least one function of a motor vehicle.

According to an embodiment of the invention, the different control zones 21, 22, 23 are dedicated to a command type.

For example, the control zones 21 and 22 can be dedicated to "push" type commands. This type of command corresponds to the pressing, by a control means for example one or more fingers, of at least a part of the control zone of the touch pad.

The control zone 23 can be dedicated to "slide" or "pinch" type commands. This type of command corresponds to the brushing of at least a part of the control zone of the touch pad by a control means, for example one or two fingers of the user.

The inventors have noticed that the optimum level of sensitivity of the capacitive touch screen is different for the different command types. Thus, by providing different control zones preferentially dedicated to a command type, it is possible to optimize the recognition of the commands from the user.

Typically, the human/machine interface according to the invention exhibits a lower sensitivity in the control zones corresponding to "slide" or "pinch" type commands than in the control zones corresponding to "push" type commands.

Optionally, the touch pad 20 is transparent and can be arranged in front of a display device such as a TFT, LCM, LCD or OLED pad.

The haptic feedback device 40 is configured to provide a haptic feedback to the user of the human/machine interface upon the recognition of his or her command.

The haptic feedback can take different forms, for example visual feedback, for example in the form of the display of an item of information, and/or sound feedback, for example in the form of a sound emitted to the user, and/or touch feedback, for example in the form of a vibration returned to the user on the touch pad.

According to an embodiment of the invention, it is advantageous to provide different haptic effects as a function of the control zone of the touch pad used.

That makes it possible to provide the user with a feedback that can be more easily identified with a function or with a command type.

For example, in the case of a vibratory haptic effect, it is possible to vary the intensity and/or the frequencies of the vibrations as a function of the control zone. That is particularly advantageous when the control zones are dedicated to command types. In effect, as a function of the "push", "slide" or "pinch" command type, the most appropriate haptic effect is not necessarily the same.

Thus, according to this embodiment, the human/machine interface according to the invention makes it possible not only to adapt the sensitivity of the different control zones but also to adapt the corresponding haptic feedback.

The control device 30 of the human/machine interface according to the invention is configured to receive from the touchpad a signal representative of a command from the user on the touch pad.

Furthermore, the control device 30 makes it possible to recognize the command from the user when the level of the signal received is greater than or equal to a threshold value.

In the human/machine interface according to the invention, the control device is configured to comprise different threshold values for at least two of the control zones of the touch pad.

The threshold values of each of the zones determine the sensitivities of the zones. Thus, the control device 30 makes it possible to adapt the sensitivities of the different control zones of the touch pad.

In particular, the control device can be configured to have a threshold value for a control zone of "slide" or "pinch" type greater than the threshold value for a control zone of "push" type.

Typically, the signal received by the control device corresponds to capacitance values measured on an array of electrodes arranged in the touch pad 20.

Figure 2:
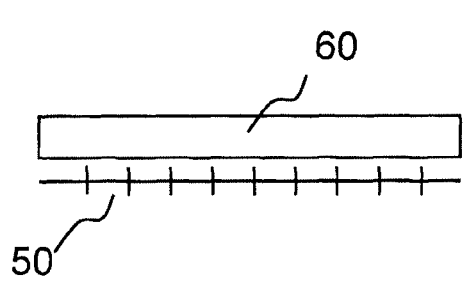
FIG. 2 illustrates a side view of a touch pad of a human/machine interface according to an embodiment of the invention.
Figure 3:
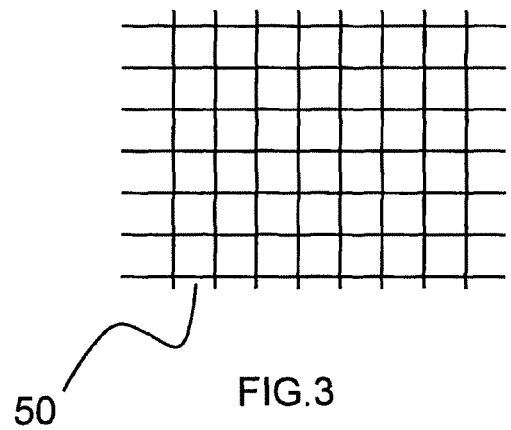
FIG. 3 illustrates an array of electrodes of a touch pad of a human/machine interface according to an embodiment of the invention.

According to the example of FIGS. 2 and 3, the touch pad 20 comprises an array of electrically charged electrodes 50.

Preferably, the array of electrodes is covered by a glass plate 60 for their protection. The electrodes can be made of IOT, indium-tin oxide, in order to ensure transparency of the touch pad.

The signal representative of a command from the user on the touch pad is typically linked to the disturbance of the electrostatic field generated by the array of electrodes upon a command from the user on the touch screen. In effect, when the user brings a control means, for example a finger or a stylus, close to the touch pad, it disturbs the electrostatic field generated by the electrodes. This disturbance can be measured and its amplitude compared to a threshold value on the control device 30.

According to a preferred embodiment of the invention, the amplitude of the signal representative of a command from the user on said touch pad is proportional to the capacitance measured between each electrode of the array of electrodes and the control means of the user, for example a finger of the user or a stylus, upon a command from the user on the touch pad.

According to an embodiment of the invention, the control device of the human/machine interface is configured to determine, for at least one of the control zones of the touch pad, the function to be activated as a function of the number of electrodes of the array of electrodes of the capacitive touch pad for which the level of the signal is greater than or equal to a threshold value.

Advantageously, the consideration, for the activation of the function, of the number of electrodes of the array of electrodes of the capacitive touch pad for which the level of the signal is greater than or equal to a threshold value, offers the human/machine interface according to the invention an additional dimension.

In particular, it is possible to distinguish commands as a function of the force with which the finger of the user pushes. In effect, the more strongly the user pushes on the touch pad, the more his or her finger is spread on the touch pad, and the greater the number of electrodes of the array of electrodes of the touch pad exhibiting a signal greater than or equal to a threshold value.

It is possible for a control zone of the touch pad to provide threshold values in terms of a number of electrodes. Typically, if the number of electrodes for which the signal is greater than a recognition threshold corresponds to a zone of between 50 $mm^2$ and 75 $mm^2$, the control device allows the activation of a first function, if the number of electrodes for which the signal is greater than said recognition threshold corresponds to a zone of between 75 mm² and 100 mm², the control device allows the activation of a second function and if the number of electrodes for which the signal is greater than said recognition threshold corresponds to a zone greater than 100 mm², the control device allows the activation of a third function.

According to a preferred embodiment of the invention, the haptic feedback device is configured to provide a different haptic feedback as a function of the number of electrodes of the array of electrodes of the capacitive touch pad for which the level of the signal is greater than or equal to said threshold value.

For example, the intensity and the frequency of the vibrations felt by the user can be different as a function of the force with which the user pushes on the touch pad.

Advantageously, that makes it possible to make a haptic feedback easier for the user to understand and identify.

Obviously, the invention is not limited to the embodiments described and extends to other variants within the scope of the claims.

Herein, the word "comprising" does not preclude other elements, and the indefinite article "a" or "an" does not preclude a plurality. The simple fact that the different features are cited together in different dependent claims does not indicate that the combination of these features cannot be used advantageously. Any reference symbol in the claims should not be interpreted as limiting the scope of the invention.

The invention claimed is:

1. A human/machine interface that controls at least two functions of a motor vehicle, the human/machine interface comprising:
   a capacitive touch pad comprising an array of electrically charged electrodes divided into at least two dedicated control zones in hardware, each dedicated control zone configured for receiving a dedicated command for at least one function;
   a haptic feedback device that provides feedback on the human/machine interface upon recognition of the dedicated command; and
   a control device that:
     receives from the touch pad a first signal representative of, and generated by, a dedicated command from the touch pad, the first signal being linked to a disturbance of an electrostatic field generated by the array of electrodes upon recognition of the dedicated command on the touch pad, and
     recognizes the dedicated command when a level of the first signal received is greater than or equal to a first threshold value, the first threshold value being a number of electrodes that measures an amplitude of the disturbance in the electrostatic field exceeding a first pre-determined value,
   wherein the control device comprises different threshold values for each one of the at least two of the dedicated control zones of the touch pad,
   wherein the control device compares the amplitude of the disturbance with each of the different threshold values to determine whether to activate any of the at least two functions,
   wherein at least one first dedicated control zone out of the at least two dedicated control zones of the touch pad is a control zone of "push" type that receives a "push" motion command,
   wherein at least one second dedicated control zone out of the at least two dedicated control zones of the touch pad is a control zone of "slide" or "pinch" type that receives a "slide" or "pinch" motion command,
   wherein the control device has a second threshold value for the control zone of "slide" or "pinch" type greater than the first threshold value for the control zone of "push" type, and
   wherein a second signal representative of the "slide" or "pinch" motion command is greater than the first signal representative of the "push" motion command.

2. The human/machine interface as claimed in claim 1, wherein the haptic feedback device provides a different haptic effect as a function of the first dedicated control zone or the second dedicated control zone of the touch pad.

3. The human/machine interface as claimed in claim 1, wherein the amplitude of the first signal representative of the dedicated command on said touch pad is proportional to the capacitance measured between each electrode of the array of electrodes and the control device upon the dedicated command on the touch pad.

4. The human/machine interface as claimed in claim 1, wherein the control device determines, for at least one of the dedicated control zones of the touch pad, the function to be activated when the level of the first signal received is greater than or equal to the first threshold value corresponding to said zone as a function of the number of electrodes of the array of electrodes of the capacitive touch pad for which the level of the first signal is greater than or equal to said first threshold value.

5. The human/machine interface as claimed in claim 4, wherein the haptic feedback device provides a different haptic feedback as a function of the number of electrodes of the array of electrodes of the capacitive touch pad for which the level of the first signal is greater than or equal to said first threshold value.

6. A dashboard of the motor vehicle comprising the human/machine interface as claimed in claim 1.

* * * * *